United States Patent [19]

Terajima et al.

[11] 3,900,422

[45] Aug. 19, 1975

[54] HEAVY METAL ADSORBENTS AND PROCESS FOR PRODUCING SAME

[75] Inventors: Kazuki Terajima; Shigeru Tomita; Yoshindo Matsuda, all of Tokyo; Keiji Abe, Ohmiya, all of Japan

[73] Assignee: Director-General of the Agency of Industrial Science and Technology, Tokyo, Japan

[22] Filed: Sept. 25, 1973

[21] Appl. No.: 400,645

[30] Foreign Application Priority Data
Sept. 26, 1972  Japan.............................. 47-95762
Oct. 27, 1972  Japan............................. 47-107101

[52] U.S. Cl................ 252/426; 252/431 C; 210/38
[51] Int. Cl............................................. C02b 1/52
[58] Field of Search............ 252/426, 431 C; 210/38

[56] References Cited
UNITED STATES PATENTS

| | | | |
|---|---|---|---|
| 1,966,553 | 7/1934 | Kropp................................. | 252/426 |
| 2,029,966 | 2/1936 | Urbain et al...................... | 252/426 X |
| 2,340,111 | 1/1944 | D'Alelio.......................... | 252/426 X |
| 2,664,397 | 12/1953 | Hutchinson..................... | 252/426 X |

*Primary Examiner*—Patrick P. Garvin
*Attorney, Agent, or Firm*—William J. Daniel

[57] ABSTRACT

Heavy metal adsorbents comprising granules of a mixture of nitrohumic acid and at least one binder selected from the group consisting of a carboxyl group-containing polymeric compound and a water-insoluble salt thereof. These heavy metal adsorbents are produced advantageously by either a process wherein a mixture of nitrohumic acid and a carboxyl group-containing polymeric compound is kneaded with an aqueous solution of alkali and the kneaded mixture is first subjected to an acid treatment and then shaped into granules, or a process wherein nitrohumic acid and a carboxyl group-containing polymeric compound are dissolved in an aqueous solution of alkali, the solution is acidified to form a precipitate and then the precipitate is separated and shaped into granules. The granular products thus obtained can be further improved in mechanical strength by means of a heat treatment.

13 Claims, No Drawings

HEAVY METAL ADSORBENTS AND PROCESS FOR PRODUCING SAME

BACKGROUND OF THE INVENTION

This invention relates to new heavy metal adsorbents possessing high mechanical strength and to a process for producing same.

Among the methods known hitherto for treatment of industrial effluents containing heavy metals, the most popular is one involving neutralization with lime. This neutralization method comprises adding quick lime or calcium carbonate to such industrial effluents thereby neutralizing any acidic substance in the effluents and at the same time converting heavy metals contained therein into easily precipitatable hydroxides. However, this method is limited in the kind and quantity of heavy metals capable of being separated and fails to attain complete removal of such heavy metals as mercury and lead. Moreover, this method results in a large amount of a heavy metal-containing sludge that is difficult to treat, thus causing secondary environmental pollution.

In addition to this method, there has been proposed a method utilizing active carbon, an ion-exchange resin or a chelate-forming agent for complexing heavy metals in effluents. However, such methods are unsuited for treating extremely large volumes of liquids, such as industrial effluents, as they require expensive treating agents and recovery or regeneration of the treating agents is difficult.

On the other hand, it is known that nitrohumic acid exhibits high adsorptivity for heavy metals dissolved in water and is easily regenerated by the action of an acid. However, this compound is low in mechanical strength when shaped into granules and is finely pulverized under even slight pressure when charged into a packing tower. In addition, this compound has the disadvantage of partially dissolving when used for treating an alkaline or neutral solution, resulting in coloration of the solution in yellowish brown. If this compound is incorporated with a conventional binder to enhance mechanical strength, the excellent heavy metal adsorbability inherent to nitrohumic acid suffers. Therefore, nitrohumic acid has not yet had practical use as a heavy metal adsorbent for the treatment of waste effluents, notwithstanding the cheapness of this compound.

BRIEF SUMMARY OF THE INVENTION

Accordingly, it is an object of this invention to provide a heavy metal adsorbent composed predominantly of nitrohumic acid, which is insoluble with high mechanical strength.

It is another object of this invention to provide a new heavy metal adsorbent comprising a shaped granular article of a mixture of nitrohumic acid and a specific class of binders.

It is still another object of this invention to provide a process for producing in good efficiency a heavy metal adsorbent composed predominantly of nitrohumic acid, and which is insoluble with high mechanical strength.

It is a further object of this invention to provide a process for homogeneously mixing nitrohumic acid with a given binder to produce a heavy metal adsorbent in granular form.

Other objects, features and advantages of this invention will be apparent from the following description.

DETAILED DESCRIPTION OF THE INVENTION

It has now been found that when at least one member selected from the group consisting of a carboxyl group-containing polymeric compound and a water-insoluble salt thereof is added as a binder to nitrohumic acid and the mixture is shaped into granules, an adsorbent of good quality is obtained, which is remarkably improved in mechanical strength while retaining the good heavy metal adsorptivity inherent to nitrohumic acid.

The heavy metal adsorbent of this invention comprises a granular shaped article of a mixture of nitrohumic acid and at least one binder selected from the group consisting of a carboxyl group-containing polymeric compound and a water-insoluble salt thereof.

Nitrohumic acid utilizable as the main ingredient of the heavy metal adsorbent of this invention is a known substance and can be prepared, for example, by oxidation of coal with nitric acid.

Examples of carboxyl group-containing polymeric compounds utilizable as the binder for the heavy metal adsorbent of this invention include carboxymethylcellulose, carboxymethylstarch, alginic acid, pectinic acid, proteins, polyacrylic acid, polymethacrylic acid, partially hydrolyzed polyacrylamide and partially hydrolyzed N-methylolated polyacrylamide or polymethacrylamide. Examples of water-insoluble salts of these carboxyl group-containing polymeric compounds include alkali earth metal salts, such as magnesium salts, calcium salts and barium salts, of the aforementioned carboxyl group-containing compounds. These compounds may be employed singly or in mixture of at least two.

These compounds or their salts impart good mechanical strength to the product when used as a binder for nitrohumic acid. Moreover, the carboxyl group contained in the binder serves to adsorb heavy metals and causes no reduction in the heavy metal-adsorbing function of the product. As a whole, the binder rather serves to enhance the heavy metal-adsorbing function of the product or exhibits a peculiar action of compensating for a reduction in the activity of nitrohumic acid usually observed in heat treatments. The binder is used in an amount of 5–50 parts by weight, preferably 10–35 parts by weight per 100 parts by weight of nitrohumic acid.

In accordance with one embodiment of this invention, the heavy metal adsorbent can be prepared advantageously according to the following method.

At the outset, nitrohumic acid is mixed with the carboxyl group-containing polymeric compound and the mixture is kneaded with an aqueous solution of alkali. The kneaded mixture can be first shaped into granules in a conventional manner and then subjected to an acid treatment for insolubilization, or, alternatively, first subjected to an acid treatment for insolubilization and then shaped into granules. In this method, the starting materials, i.e., nitrohumic acid and the carboxyl group-containing polymeric compound, may be in either free acid form or soluble salt form such as the sodium salt or potassium salt thereof. The aqueous solution of alkali used in the kneading treatment is preferably a 5–25% aqueous solution of sodium hydroxide or potassium hydroxide, but may be ammonia water. As an acid utilizable for insolubilization of the kneaded mixture, there can be mentioned hydrochloric acid, nitric acid, sulfuric acid, phosphoric acid and the like inorganic acids.

Methods for shaping the kneaded mixture into granules include those wherein the mixture is shaped into pellets and, if desired, washed with water and dried and those wherein the mixture is dried as is to lumps and crushed into granules of a desired granular size.

In accordance with another embodiment of this invention, the heavy metal adsorbent can be prepared in the following manner: nitrohumic acid and the carboxyl group-containing polymeric compound are dissolved in an aqueous solution of alkali and an acid is then added to the solution to co-precipitate the nitrohumic acid and the carboxyl group-containing polymeric compound. The precipitate is separated from the solution and then shaped into granules. An aqueous solution of sodium hydroxide or potassium hydroxide having a concentration of 1–10% is preferable as an aqueous solution of alkali used in this case, but ammonia water may also be used. Examples of acids utilizable for the formation of the co-precipitate include inorganic acids such as hydrochloric acid, nitric acid, sulfuric acid, phosphoric acid and the like.

The precipitate formed by the addition of an acid is separated from the solution by means of filtration or centrifugal separation, dried and recovered as solid lumps, which are then crushed into granules of an adequate size.

In this invention, the granular article of a mixture of nitrohumic acid and the carboxyl group-containing polymeric compound obtained by either of the above-mentioned methods can be treated with an aqueous solution containing an alkali earth metal ion, such as calcium ion, barium ion or magnesium ion, whereby the free acid residues in the nitrohumic acid and the binder are converted into the alkali earth metal salt groups to enhance insolubility.

The granular article can also be heated for 0.5–5 hours in open air or in an inert gas atmosphere at 120°–200°C, preferably at 130°–180°C, thereby enhancing insolubilization and strength.

An inorganic filler in an amount of 10–100 parts by weight per 100 parts by weight of nitrohumic acid may optionally be added to the heavy metal adsorbent of this invention. Examples of the inorganic fillers include sand, rock powder, glass powder, Shirasu (vitreous volcanic ash), clay and talc. These fillers are added for the purpose of enhancing strength and adjusting the specific gravity of the adsorbent.

When the heavy metal adsorbent of this invention is brought into contact with an aqueous solution containing heavy metals by a suitable means, the adsorbent adsorbs the heavy metals contained in the solution, thus serving to eliminate heavy metals effectively from the solution. For example, heavy metals such as cadmium, mercury, lead, chromium and copper can be eliminated at an efficiency of 95% or higher.

The adsorbent thus used for elimination of heavy metals can easily be regenerated by washing with a 0.1–1.0 N solution of a strong mineral acid such as hydrochloric acid or sulfuric acid.

Unlike nitrohumic acid itself, the heavy metal adsorbent of this invention possessed high abrasion-resistance and compression strength and is not pulverized when charged under pressure into a packing tower. In addition, the adsorbent by virtue of its use as a binder of the carboxyl group-containing polymeric compound capable per se of heavy metal adsorption has the advantage that its heavy metal adsorptivity is almost equivalent to nitrohumic acid alone.

This invention will be understood more readily with reference to the following examples; however, these examples are intended to illustrate the invention and are not to be construed as limiting the scope of the invention.

EXAMPLE 1

A. Preparation of Adsorbent

Nitrohumic acid and sodium salt of carboxymethylcellulose were mixed in amounts respectively shown in Table I. After addition of a 20% aqueous solution of sodium hydroxide, the mixture was kneaded for one hour in a kneader. The kneaded mixture was then extrusion molded into pellets by the aid of an extrusion molding machine and dried. The dried pellets were dipped into 1-N hydrochloric acid to convert soluble sodium salts of nitrohumic acid and the polymeric compound contained in the pellets into insoluble acid form.

B. Conversion into Salt Form:

The acid-form adsorbent obtained according to (A) was washed with water and then dipped into an aqueous solution of 1 mol of calcium chloride for conversion into a calcium salt form.

C. Treatment of an Aqueous Solution Containing Heavy Metals

Each of the materials obtained as described above was processed to granules having a size of 32–60 mesh, washed with water, dried and then used for treating an aqueous solution containing heavy metals. The method of this treatment comprised adding to the solution adjusted to have a pH of 6 the adsorbent in an amount of 1 g. per liter of the solution and shaking the solution overnight. After this treatment, the adsorbent was separated and the resulting supernatant liquid was measured by the atomic adsorptiometric method to determine the concentration of heavy metals in the liquid for obtaining the rate of removal. The initial concentration of heavy metals in the solution used was $10^{-4}$ mol/liter.

The results of the above experiments are shown in Table I.

TABLE I

| Exp. No. | Composition of Adsorbent (parts by weight) | | | Strength of Granules (Kg.)[4] | Rate of Removal for Heavy Metals (%) | | |
|---|---|---|---|---|---|---|---|
| | HA[1] | MC[2] | Alg[3] | | $Cd^{++}$ | $Hg^{++}$ | $Pb^{++}$ |
| 1 | 100 | 30 | 0 | 1.0–1.5 | 95.7 | 95.7 | 99.4 |
| 2 | 100 | 20 | 10 | 0.6–1.0 | 95.2 | 98.9 | 99.3 |
| 3 | 100 | 20 | 0 | 0.4–1.0 | 94.4 | 98.2 | 98.4 |
| 4 | 100 | 20 | 0 | 0.4–1.0 | 95.4 | 98.4 | 99.8 |
| 5 | 100 | 0 | 30 | 0.5–1.2 | 97.5 | 98.9 | 99.7 |
| 6 | 100 | 0 | 0 | <0.1 | 96.8 | 99.5 | 99.4 |
| 7 | 100[5] | 30 | 0 | 1.0–1.6 | 98.8 | 99.8 | 99.7 |

[1]Nitrohumic acid
[2]Carboxymethylcellulose
[3]Alginic acid
[4]Load to crush one granule having a size of about 25 mesh
[5]Calcium salt form

EXAMPLE 2

An adsorbent obtained in a manner similar to that described in Example 1 (A) and (B) was washed with water, charged into a heating furnace and heated at 130°–250°C for 2 hours to attain complete insolubilization. The product after the heat treatment was insoluble in water and in fact gave no coloration when immersed in water for a long period of time. On the other hand, a similar product not subjected to the heat treatment when immersed in water gave a yellowish brown color which was the sign of dissolution of the nitrohumic acid.

EXAMPLE 3

A. Preparation of Adsorbent:

One kilogram of nitrohumic acid obtained by oxidation of coal with nitric acid was dissolved in 5 liters of a 2 percent aqueous solution of sodium hydroxide having dissolved therein sodium carboxymethylcellulose in an amount tabulated in Table II. 0.5 Liters of conc. hydrochloric acid was then added to the solution under agitation whereby a precipitate was formed. The precipitate was separated and air dried to afford a lumpy material, which was then crushed and washed with 0.1-N hydrochloric acid.

All of the products thus obtained had a satisfactory mechanical strength and were not easily worn in handling.

B. Treatment of Effluent Containing Heavy Metals

Samples of (a) the adsorbent obtained by crushing the above prepared purified material into granules of 25–32 mesh and (b) an adsorbent obtained by treating the adsorbent (a) with an aqueous solution containing an alkali earth metal (concentration: 1 mol/liter) were used for treating effluents containing various kinds of heavy metals. The method of this treatment comprised adding to the solution adjusted to have a pH of 6 the adsorbent in an amount of 1 g. per liter of the solution and shaking the solution overnight. After this treatment, the adsorbent was separated and the resulting supernatant liquid was measured by the atomic absorptiometric method to determine the concentration of heavy metals in the liquid for obtaining the rate of removal. The initial concentration of heavy metals in the solution used was $10^{-4}$ mol/liter.

The results of the above experiments are shown in Table II wherein NHA stands for nitrohumic acid and the amount of sodium carboxymethylcellulose used is per 100 parts by weight of nitrohumic acid.

TABLE II

| Exp No. | Treating Agent | Mixing Ratio[1] | Strength[2] | Rate of Removal for Heavy Metals (%) | | |
|---|---|---|---|---|---|---|
| | | | | $Cd^{++}$ | $Hg^{++}$ | $Pb^{++}$ |
| 1 | NHA | 0 | 0.0–0.1 | 96.8 | 98.9 | 100.0 |
| 2 | NHA | 1 | — | 96.8 | 99.1 | 98.1 |
| 3 | NHA | 2 | — | 96.8 | 99.4 | 98.1 |
| 4 | NHA | 5 | — | 96.8 | 94.6 | 98.6 |
| 5 | NHA | 10 | 0.1–0.3 | 96.6 | 99.0 | 99.5 |
| 6 | NHA | 20 | 0.4–0.8 | 96.1 | 98.8 | 99.5 |
| 7 | NHA | 50 | 3.0–4.3 | 93.9 | 98.4 | 97.4 |
| 8 | NHA–Mg | 25 | 0.5–1.2 | 94.2 | 99.0 | 100.0 |
| 9 | NHA–Ca | 25 | 0.5–1.2 | 92.4 | 98.9 | 100.0 |

[1]Amount of Sodium carboxymethylcellulose added.
[2]Load (kg.) to crush one granule having a size of 12–25 mesh

EXAMPLE 4

In a manner similar to that described in Example 3, a treating agent was prepared from 1 kg. of nitrohumic acid and 250 g. of carboxymethylcellulose. The treating agent having a granule size of 25–32 mesh (5 g.) was charged into a glass tube (10 mm in diameter) and an aqueous solution containing cadmium ion was passed therethrough at a rate of 200 ml/hour. The concentration of the solution at the exit of a tube was measured in relation to the amount of solution passed. The results are shown in Table III. The $Cd^{++}$ concentration of the solution used was $10^{-4}$ mol/liter.

TABLE III

| Amount of Solution Passed (liter) | Concentration at Exit of the Packing Tower (ppm) |
|---|---|
| 20 | 0.000 |
| 22 | 0.000 |
| 24 | 0.018 |
| 26 | 0.153 |
| 27 | 0.300 |
| 28 | 0.550 |
| 29 | 0.970 |
| 30 | 1.590 |

EXAMPLE 5

A. Preparation of Adsorbent

100 Grams of nitrohumic acid, 15 g. of petroleum protein and 5 g. of polyacrylic acid were well mixed and 300 ml of water containing 20 g. of sodium hydroxide were added. The mixture was kneaded for one hour at 60°C by the aid of a kneader. The mixture was then shaped into granules having a size of 16–25 mesh by means of an extrusion molding machine and the resulting granules were dried in an air stream. The granules were then treated for 5 hours with 1-N hydrochloric acid, washed with water, dried at room temperature and heated for 2 hours at 160°C.

B. Treatment of an Aqueous Solution Containing Heavy Metals

One gram of the adsorbent obtained as in (A) above was added to an aqueous solution containing cadmium, mercury of lead in a concentration of $2 \times 10^{-4}$ mol/liter and the solution was adjusted to have a pH of 6 and shaken for 20 hours. The supernatant liquid was collected and measured by the atomic absorptiometric method to determine the concentration of each heavy metal for obtaining the rate of removal. As the results of measurements, the rates of removal for cadmium, mercury and lead were 94.4, 95.3 and 97.6 percent, respectively.

What is claimed is:

1. A composition of matter comprising a granular mixture of nitrohumic acid and about 5–50 parts by weight per 100 parts of said nitrohumic acid of at least one carboxyl-containing polymeric binder selected from the group consisting of carboxymethylcellulose, carboxymethylstarch, alginic acid, pectinic acid, protein, polyacrylic acid, polymethacrylic acid, partially hydrolyzed polyacrylamide, partially hydrolyzed N-methylolated polyacrylamide, partially hydrolyzed N-methylolated polymethacrylamide and water-insoluble salts thereof.

2. A composition of matter according to claim 1 wherein at least one of carboxymethylcellulose and alginic acid is used as the carboxyl-containing polymeric binder.

3. A composition of matter according to claim 1 wherein at least one of a protein and polyacrylic acid is used as the carboxyl-containing polymeric binder.

4. A composition of matter according to claim 1 including about 10–100 parts by weight of an inorganic filler per 100 parts by weight of said nitrohumic acid in said mixture.

5. A process for producing a composition of matter comprising the steps of (A) kneading with an aqueous alkaline solution a mixture of nitrohumic acid and about 5–50 parts by weight per 100 parts of said acid of a water-soluble salt of a carboxyl-containing polymeric binder selected from the group consisting of carboxymethylcellulose, carboxymethylstarch, alginic acid, pectinic acid, protein, polyacrylic acid, polymethacrylic acid, partially hydrolyzed polyacrylamide, partially hydrolyzed N-methylolated polyacrylamide and partially hydrolyzed N-methylolated polymethacrylamide, and (B) shaping the kneaded mixture into granules and subjecting them to an acid treatment to insolubilize said binder.

6. A process according to claim 5 wherein the resulting granules are contacted with an aqueous solution containing an alkali earth metal salt to convert free acid groups to insoluble salt form.

7. A process according to claim 6 wherein the resulting granules are heated in the range of about 120°–200°C for about 0.5–5 hours.

8. A process for producing a composition of matter characterized by dissolving nitrohumic acid and about 5–50 parts by weight per 100 parts of said acid of a water-soluble salt of a carboxyl-containing polymeric binder selected from the group consisting of carboxymethylcellulose, carboxymethylstarch, alginic acid, pectinic acid, protein, polyacrylic acid, polymethacrylic acid, partially hydrolyzed polyacrylamide, partially hydrolyzed N-methylolated polyacrylamide and partially hydrolyzed N-methylolated polymethacrylamide in an aqueous solution of alkali, acidifying the aqueous solution with an acid to form a precipitate, separating the precipitate and then shaping it into granules.

9. A process according to claim 8 wherein the resulting granules are contacted with an aqueous solution containing an alkali earth metal salt to convert free acid groups to insoluble salt form.

10. A process according to claim 9 wherein the resulting granules are heated in the range of about 120°–200°C for about 0.5–5 hours.

11. A process for producing a composition of matter comprising the steps of (A) kneading with an aqueous alkaline solution a mixture of nitrohumic acid and about 5–50 parts by weight per 100 parts of said acid of a water-soluble salt of a carboxyl-containing polymeric binder selected from the group consisting of carboxymethylcellulose, carboxymethylstarch, alginic acid, pectinic acid, protein, polyacrylic acid, polymethacrylic acid, partially hydrolyzed polyacrylamide, partially hydrolyzed N-methylolated polyacrylamide and partially hydrolyzed N-methylolated polymethacrylamide, and (B) subjecting the kneaded mixture to an acid treatment to insolubilize said binder and then shaping the thus treated mixture into granules.

12. A process according to claim 11 wherein the resulting granules are contacted with an aqueous solution containing an alkali earth metal salt to convert free acid groups to insoluble salt form.

13. A process according to claim 12 wherein the resulting granules are heated in the range of about 120°–200°C for about 0.5–5 hours.

* * * * *